United States Patent Office 3,031,366
Patented Apr. 24, 1962

3,031,366
DEGRADED ORGANOPOLYSILOXANES AS ADHESIVES
Arthur M. Bueche and Curtis S. Oliver, Schenectady, N.Y., assignors to General Electric Company, a corporation of New York
No Drawing. Filed Apr. 10, 1958, Ser. No. 727,545
4 Claims. (Cl. 156—329)

This application is a continuation-in-part of our co-pending application Serial No. 580,184, now abandoned, filed April 24, 1956, and assigned to the same assignee as the present invention.

This invention relates to a room temperature-curing organopolysiloxane adhesive and to the method of its preparation. Still more particularly, this invention relates to a room temperature curing organopolysiloxane adhesive comprising a degraded (hereafter defined) organopolysiloxane containing on the average of about 1.9 to 2.1, and preferably 1.98 to 2.0, hydrocarbon groups attached to silicon atoms through C—Si linkages, (2) a minor proportion of ammonium carbonate, and (3) a silica filler. This invention also relates to a process of bonding two or more materials which comprises employing said compositions and to the product so formed.

Because of the excellent properties of organopolysiloxanes, it is desirable to prepare adhesives of these materials. One of the difficulties in employing organopolysiloxanes as adhesives is the fact that these materials are usually cured at elevated temperature. However, the use of high temperature places a restriction on the commercial acceptance of organopolysiloxane adhesives.

In U.S. Patent 2,596,085, Wormuth, there is described the use of ammonium carbonate as a low temperature curing agent for organopolysiloxanes. Although the cured organopolysiloxanes described therein are useful as elastomers, they do not make good adhesives.

We have now discovered that a composition comprising (1) a degraded organopolysiloxane containing on the average of about 1.9 to 2.1, and preferably 1.98 to 2.0, hydrocarbon groups attached to silicon atoms through C—Si linkages, (2) a minor proportion of ammonium carbonate, for example, 0.1 to 4 percent or more based on weight of (1) and (3) 10 to 90 percent, but preferably 25 to 75 percent of a silica filler, based on total weight of product produces an excellent room temperature curing adhesive. This result is surprising since ammonium carbonate-organopolysiloxane compositions which are not degraded are not good adhesives. Furthermore, the organopolysiloxanes described in the Wormuth patent which contain no filler or a filler other than silica will not degrade sufficiently when treated in the manner of this invention to produce a suitable adhesive.

In general, organopolysiloxanes useful as adhesives are degraded by heating a milled mixture of an organopolysiloxane gum and silica in a closed container at a temperature of from 100° to 350° C., preferably 120° to 200° C. for 10 to 60 minutes or longer. Organopolysiloxanes treated in this manner are herein defined as "degraded organopolysiloxanes." These degraded organopolysiloxanes have a very minor amount of "structure" after the degradation step described above, but as soon as they are worked mechanically, such as by spreading with a spatula or by milling, they assume a paste-like or grease-like consistency. The consistency of this paste-like or grease-like material can be defined in terms of its penetration which is determined by the method set forth in ASTM standard D–217–52T. Specifically, this material has a penetration of from about 120–310. It has been found that little degradation takes place when silica is not incorporated into the organopolysiloxane gum prior to heating in the closed container. Furthermore, in order to effect degradation with silica, it is necessary that the heating be carried out in a closed container. An organopolysiloxane-silica composition heated in an open container at the same temperature does not degrade sufficiently to form a satisfactory adhesive. In carrying out this degradation, we advantageously incorporate a lower aliphatic alcohol containing up to four carbon atoms, such as ethanol, propanol, butanol, etc., and isomers thereof into the silica-containing gum prior to degradation. The amount of alcohol advantageously used is 0 to 20 percent but preferably 5 to 15 percent, based on weight of organopolysiloxane. After degradation the product is remilled to form a soft paste which stays soft for long periods of time when protected from the atmosphere.

This paste is then used as an adhesive. Since ammonium carbonate causes a room temperature cure, it is not desirable to incorporate it into the paste a long time prior to use. It is preferable to mix the ammonium carbonate into the paste just prior to use or to spread the paste on one member to be bonded and to sprinkle ammonium carbonate thereon before applying the other member to be joined.

The organopolysiloxanes degraded according to this invention are those organopolysiloxanes curable to the solid elastic state. These curable organopolysiloxanes or silicone compositions may be highly viscous masses, or gummy elastic solids, depending on the state of condensation, the condensing agent employed, the starting organopolysiloxane used to make the curable organopolysiloxanes, etc. Although curable organopolysiloxanes with which the present invention is concerned are well known, for purposes of showing persons skilled in the art the various organopolysiloxanes which may be employed in the practice of the present invention, attention is directed to the curable organopolysiloxanes disclosed and claimed in Agens Patent 2,448,756; Sprung et al. Patent 2,488,556; Sprung Patent 2,484,595; Krieble et al. Patent 2,457,688; Hyde Patent 2,490,357; Marsden Patent 2,521,528; and Warrick Patent 2,541,137.

It will, of course, be understood by those skilled in the art that other curable organopolysiloxanes containing the same or different silicon-bonded organic substituents (alkyl, e.g., methyl, ethyl, propyl, butyl, octyl, etc.; alkenyl, e.g., vinyl, allyl, etc.; cycloalkenyl, e.g., cyclohexenyl, etc.; aryl, e.g., phenyl, tolyl, xylyl, naphthyl, etc.; aralkyl, e.g. benzyl, phenylethyl, etc.; halogenated aryl, e.g. chlorophenyl, dibromophenyl, etc.; cycloalkyl e.g. cyclohexyl, etc.; alkinyl, e.g. ethinyl, etc.; both methyl and phenyl, etc. radicals) connected to silicon atoms by carbon-silicon linkages, may be employed without departing from the scope of the invention.

The particular curable organopolysiloxane degraded is not critical and may be any one of those described in the foregoing patents and is generally obtained by condensing a liquid organopolysiloxane containing a average of from about 1.9 to 2.1 preferably from about 1.98 to about 2.01, silicon-bond organic groups per silicon atom. The usual condensing agents which may be employed and which are well known in the art may include, for instance, acid condensing agents, e.g. ferric chloride hexahydrate, phenyl phosphoryl chloride, and the like; alkaline condensing agents, e.g., quaternary phosphonium hydroxides and alkoxides, so lidquaternary ammonium hydroxides, potassium hydroxide, cesium hydroxide, etc. These curable organopolysiloxanes generally comprise polymeric diorganosiloxanes which may contain, for example, from 0 to 2 mol percent copolymerized monoorganosiloxane, for example, copolymerized monomethylsiloxane. Generally, we prefer to use as the starting organopolysiloxane from which the curable organopolysiloxanes are prepared, one which contains about 1.98 to 2.01, inclusive, organic groups, for example, methyl groups per silicon atom where more than about 90 percent of the silicon atoms in the polysiloxane contain two silicon-bonded alkyl groups.

The starting organopolysiloxanes used to make the curable organopolysiloxanes by condensation thereof preferably comprise organic substituents consisting essentially of monovalent organic radicals attached to silicon through carbon-silicon linkages and in which the siloxane units consists of units of the structural formula $R_2SiO$ where R is preferably a radical of the group consisting of methyl and phenyl radicals. At least 50 percent of the total number of R groups are preferably methyl radicals. The polysiloxane may be one in which all of the siloxane units are $(CH_3)_2SiO$ or the siloxane may be a copolymer of dimethylsiloxane and a minor amount (e.g., from 1 to 20 mol percent) of any of the following units alone or in combination therewith: $C_6H_5(CH_3)SiO$ and $(C_6H_5)_2SiO$.

A class of silicas useful for our invention are those having numerous pores or voids therein. These porous materials having exposed surfaces within the particles so that liquids and gases can penetrate to the surfaces of the pore walls are three-dimensional networks whose surfaces are extended by open pores.

The preparation of high surfaces area silicas and the chemical changes that occur when silicic acid goes to silica gel or hydrated silica are described in "Natural and Synthetic High Polymers," by K. M. Meyer, page 85, (1942), and by Hurd, "Chemical Reviews," vol. 22, No. 3, page 403 (1938).

A typical method of preparing precipitated silica comprises precipitating silica by the addition of $H_2SO_4$ to a sodium silicate solution and working the gel relatively free of salts with water. If water is evaporated from the gel in this state, the latter shrinks considerably in volume due to the force exerted on the solid phase of the gel by the surface tension of the liquid as it recedes in the pores of the material. These materials, which are called xerogels, can be used in this process.

In contrast to xerogels, aerogels are composed of the original solid phase gel in substantially the same condition as while filled with the swelling liquid. Aerogels are conveniently made by raising the gel to the critical temperature of the liquid contained therein while maintaining the pressure on the system sufficiently high to insure that the liquid phase will remain liquid until the critical temperature is reached. At this point, the liquid will be converted into the gaseous state without the formation of menisci at the gas-liquid interface. The degree of porosity may be controlled to a large degree by controlling the concentration of the silica in the gel as it is precipitated. These aerogels may be used in this condition or they may be ground to a finer state of subdivision.

An example of an aerogel is Santocel-CS marketed by Monsanto Chemical Company which has a specific surface area of about 160 square meters per gram.

Silicas prepared by other methods may also be used, for example, by burning various silicon-containing compounds, such as silicate esters (Patent 2,399,687, McNabb) and silicon tetrachloride. An example of a fume silica (i.e. prepared from burning $SiCl_4$) is "Cab-O-Sil" (also called "Aerosil") which has a surface area of about 200 square meters per gram. (Cab-O-Sil is manufactured by Godfrey L. Cabot Inc., Boston, Mass.)

Additional descriptions of finely divided silicas useful in our invention can be found in U.S. Patent, 541,137, Warrick, and in Iler "The Colloidal Chemistry of Silica and Silicates," chapter V, pp. 127–180, Cornell University Press (1955), which chapter relates to amorphous silica gels and powders.

The maximum amount of filler that may be incorporated into the organopolysiloxane with optimum results will, of course, depend on the surface area of the silica employed. Thus, above 75 percent it is preferable to use lesser amounts of a high surface area silica than one of a lesser surface area.

In order that those skilled in the art may better understand how the present invention may be practiced, the following examples are presented by way of illustration and not by way of limitation. All parts are by weight.

*Example 1*

A methylpolysiloxane gum was prepared by heating octamethylcyclotetrasiloxane with 0.01 percent KOH for about 6 hours. This gum had a room temperature viscosity of about $1 \times 10^6$ centipoises.

*Example 2*

A mixture of 100 grams of the methylpolysiloxane gum prepared in Example 1, 40 grams of silica aerogel (Santocel-CS) and 10 grams of ethyl alcohol was prepared on a rubber mill. This mixture was placed in a closed mold, heated for 10 minutes at 140° C., cooled, removed, and remilled to form a paste which had an ASTM–D217–52T pentration of about 150. A layer of this paste was put on a series of aluminum sheets which had been primed with partially hydrolyzed ethyl orthosilicate. Priming was done by coating the surface with a thin film of tetraethylorthosilicate containing 0.3 percent by weight of anhydrous $FeCl_3$. The film was allowed to stand for 5 minutes in moist air to become hydrolyzed and was then rinsed off throughly with water and dried. Powdered ammonium carbonate (about 1 gram) was sprinkled over the paste on each sheet and another aluminum sheet similarly primed was pressed on top of the paste and the assembly allowed to stand for 16 hours to form a strong bond. When these aluminum sheets were sheared apart, strengths in the range of 100–300 p.s.i. were obtained. These composite structures were kept at −17° C. for two months, and could be dropped on the floor without separation of the aluminum sheets.

*Example 3*

The method of Example 2 was repeated except that the degrading step was omitted. The two aluminum sheets could be easily pulled apart since the bond formed was so weak it could not be tested.

*Example 4*

In order to test the tensile strength of the compositions of this invention apart from its adhesion, the compositions were cured between ethylcellulose sheets to which the compositions did not adhere.

One hundred grams of the organopolysiloxane prepared in Example 1, 45 grams of silica aerogel (Santocel-CS), and 5 grams of ethanol were mixed on the rubber mill, heated for twenty minutes at 150° C. in a closed mold, cooled, and remilled to a smooth paste having an ASTM–D217–52T penetration of about 290. This was divided into three portions.

Portion A (without any curing agent) was pressed between two sheets of ethylcellulose; portion B was pressed between similar sheets, the top removed and the paste sprinkled with ammonium carbonate (about 0.25 gram) and the sheet replaced; portion C was milled with ammonium carbonate (2 grams per 120 grams of paste), cold molded between similar sheets and allowed to stand. After one hour, portion C had developed strength enough to be handled and flexed somewhat when the ethylcellulose sheets were removed in each case. After 24 hours at room temperature, portion A was still a paste, cured portion B had a tensile strength of 370 p.s.i. and about 50 percent ultimate elongation and cured portion C had a tensile strength of 220 p.s.i. and the same ultimate elongation.

Thus, despite degradation, the adhesive of this invention preserved a good part of its tensile strength.

We have found that the cure acceleration of the degraded organopolysiloxane adhesive may be further improved if one incorporates with the ammonium carbonate small amounts of known cure accelerators for silicone rubbers. Thus, one may employ additional cure accelerators, such as, for example, benzoyl peroxide, tertiary butyl perbenzoate, zirconyl nitrate, etc. with the ammonium carbonate in amounts ranging from about 0.1 to 5 or more parts of the aforementioned cure accelerators per 100 parts of organopolysiloxane. The omission of ammonium carbonate or the other curing catalysts, examples of which have been given above, will not give a cure of the degraded organopolysiloxane adhesive at room temperature.

*Example 5*

This example illustrates the use of another cure accelerator with ammonium carbonate. The procedure of Example 2 was repeated execept that 1.5 grams of benzoyl peroxide was incorporated into the paste prior to remilling. Two aluminum sheets were bonded in a similar manner by allowing to stand at room temperature for 16 hours to form a strong bond.

In contrast, the use of the above composition without ammonium carbonate did not bond the aluminum sheets (any more than the original uncured paste) after being allowed to stand at room temperature for 16 hours. Even after standing many days, little, if any, improvement in bonding was observed.

The cured, bonded material containing benzoyl peroxide described in this example was then heated for over 24 hours at 250° C. with very little, if any, deterioration of the bond.

It will of course be apparent to those skilled in the art, that in addition to the benzoyl peroxide employed above, other cure accelerators, some of which have been mentioned previously, may be employed with the ammonium carbonate to effect an acceleration of the cure at room temperature over that when these other cure accelerators are omitted from the formulation using the ammonium carbonate as the accelerator. It will also be apparent that the ammonium carbonate may be the only cure accelerator employed with the degraded organopolysiloxane adhesive. After standing at room temperature for the required time to effect the substantial bonding, if desired, additional heat treatment may be used to accelerate the bonding. This latter heat treatment may of course require relatively lower temperatures than is usually required, when using, for instance, cure accelerators or vulcanizers such as benzoyl peroxide, The use of other cure accelerators with the ammonium carbonate may require only fractions of one percent to give the added effect described above. Thus, we may use amounts of other cure accelerators ranging for example, from about 0.01 to 5 or 6 percent or more by weight, based on the weight of the degraded organopolysiloxane.

*Example 6*

A mixture of 100 grams of the organopolysiloxane gum prepared in Example 1, 40 grams of silica aerogel (Santocel-CS) and 10 grams of ethyl alcohol was prepared on a rubber mill. This mixture was then placed in a closed mold, heated for 10 minutes at 140° C., removed, cooled, and remilled to form a paste having an ASTM–D217–52T penetration of about 150. This paste was pressed into sheet form between pieces of ¼ inch pieces of primed aluminum (in the manner of Example 2) and placed in a jar containing an atmosphere of ammonia for 60–70 hours. A strong bond was formed.

In addition to being cured in an atmosphere of ammonia, cure has also been effected in the presence of low boiling amines, such as the alkyl amines, for example, mono-, di-, and trialkyl amines, e.g. mono-, di-, and trimethyl, ethyl, propyl, etc. amines. Cures can also be effected in the presence of ammonium salts that exert a vapor pressure of ammonia.

*Example 7*

This example illustrates that other fillers cannot be used in carrying out this invention.

The process of Example 2 was carried out except that diatomaceous earth (John-Mansville Celite-270) was substituted for the silica with no more bonding than that observed with the uncured paste. Similar unsuccessful results were obtained with another diatomaceous earth (Superpox) as well as carbon black, precipitated calcium carbonate and clays when they were substituted for the silica of Example 2.

The present invention is particularly useful in bonding metal and glass surfaces, wherein metal is bonded to the same or a different metal or to glass, and glass or ceramic surfaces are bonded to each other or to a metal surface. In preparing these surfaces for bonding, it is desirable that the surface be substantially free of dirt and oxide formation. Thereafter, it is preferable that the surface be "primed" with a suitable agent which enhances the bonding of the composition of this invention. One such "priming" agent is described in U.S. Patent 2,643,964 which patent is incorporated by reference into the present specification. The priming agent therein described is a hydrolyzable organosilicate, such as an orthosilicate ester which can be hydrolyzed on the surface to be bonded. This silicate either with or without a hydrolytic-inducing catalyst, for example $FeCl_3$, is applied to the surface. The surface may be preferably blown dry with a jet of air or may be left exposed to air for a short time and then subjected to an acid medium if it is to be hydrolyzed by external means. If the hydrolysis is effected by means of a catalyst incorporated into the silicate, then such additional step will be unnecessary. After hydrolysis is substantially completed, it is desirable to wash or rinse the hydrolyzed surface with water to remove any residual traces of acid. The surface after being dried to remove traces of water is now ready to be bonded.

A wide variety of metals may be bonded by the compositions of this invention. Among these are aluminum, magnesium, copper, brass, nickel, iron, steel, etc. A wide variety of glass or ceramics may also be bonded. Not only may sheets of these materials be bonded but the adhesive can be used to bond glass tapes, glass fiber sheets, and glass cloths. It can be used to seal the casing in electrical discharge devices or other electrical devices where a strong glass-to-glass, or metal-to-metal or glass-to metal bond is desired.

In addition, the adhesive composition can be used to coat or to bond various cloths prepared from synthetic fibers, for example, cotton, nylon, Dacron cloth, etc. Because the adhesive can be cured at room temperature, it is admirably suited to cloths that are sensitive to heat.

Cloth backed tapes of this composition are suitable for electrical insulation. Thus, the organopolysiloxane composition can be cured on the cloth prior to applying to the conductor or may be cured after it has been wound around the conductor.

In addition, because it can be rendered adhesive at room temperature it can be used for sealing roof shingles, as pipe seals, etc.

Because it forms bonds which are flexible at extremes of temperature, it can be used in bonding sections of refrigerators, aircraft, stoves, ovens, outdoor lamp seals, etc.

What we claim as new and desire to secure by Letters Patent of the United States is:

1. Two surfaces bonded to each other through the medium of a cured adhesive composition comprising a degraded paste-like organopolysiloxane obtained by (A) heating in a closed container in the absence of any curing agent at a temperature from 100 to 350° C., a mixture of ingredients consisting essentially of (*a*) a silica filler selected from the class consisting of silica aerogel, fume silica and precipitated silica, (*b*) an organopolysiloxane containing an average of from 1.9 to 2.1 hydrocarbon groups per silicon atom, and (c) a lower aliphatic alcohol containing up to 4 carbon atoms, and (B) milling the product of (A) to a paste-like consistency.

2. The surfaces bonded to each other through the medium of a cured adhesive composition comprising (1) a degraded paste-like organopolysiloxane obtained by (A) heating in a closed container in the absence of any curing agent at a temperature from 100 to 350° C., a mixture of ingredients consisting essentially of (a) a silica filler selected from the class consisting of silica aerogel, fume silica, and precipitated silica, (b) an organopolysiloxane containing an average of from 1.9 to 2.1 hydrocarbon groups per silicon atom and (c) a lower aliphatic alcohol containing up to 4 carbon atoms and (B) milling the product of (A) to a paste-like consistency, and (2) a minor proportion of ammonium carbonate.

3. Two surfaces bonded to each other through the medium of a cured adhesive composition comprising (1) a degraded paste-like methylpolysiloxane obtained by (A) heating in a closed container in the absence of any curing agent at a temperature from 100 to 350° C., a mixture of ingredients consisting essentially of (a) a silica filler selected from the class consisting of silica aerogel, fume silica, and precipitated silica, (b) a methylpolysiloxane containing an average of from 1.9 to 2.1 methyl groups per silicon atom, and (c) a lower aliphatic alcohol containing up to 4 carbon atoms, and (B) milling the product of (A) to a paste-like consistency, and (2) a minor proportion of ammonium carbonate.

4. Two surfaces bonded to each other through the medium of the cured adhesive of claim 3 where the curing agent includes benzoyl peroxide in addition to ammonium carbonate.

References Cited in the file of this patent

UNITED STATES PATENTS

| | | |
|---|---|---|
| 2,567,316 | Bidaud | Sept. 11, 1951 |
| 2,596,085 | Wormuth | May 6, 1952 |
| 2,643,964 | Smith-Johannsen | June 30, 1953 |
| 2,673,843 | Humphrey et al. | Mar. 30, 1954 |
| 2,709,161 | Kilbourne et al. | May 24, 1955 |
| 2,777,827 | Doede et al. | Jan. 15, 1957 |
| 2,914,502 | Bueche | Nov. 24, 1959 |